United States Patent [19]

Berecz

[11] Patent Number: 4,687,398

[45] Date of Patent: Aug. 18, 1987

[54] COMPOSITE RIVET WITH COLLAR REINFORCED WITH CIRCUMFERENTIAL FIBERS

[75] Inventor: Imre Berecz, El Toro, Calif.

[73] Assignee: Microdot Inc., Darien, Conn.

[21] Appl. No.: 738,962

[22] Filed: May 29, 1985

[51] Int. Cl.⁴ ............................................. F16B 19/08
[52] U.S. Cl. .................................. 411/503; 411/361; 411/908; 244/132
[58] Field of Search ............... 411/361, 377, 501, 503, 411/508, 509, 900–903, 907, 908

[56] References Cited

U.S. PATENT DOCUMENTS

| | | | |
|---|---|---|---|
| 3,354,260 | 11/1967 | Brandt et al. | 411/909 X |
| 3,544,143 | 12/1970 | Ohlsson | 411/501 X |
| 4,143,580 | 3/1979 | Luhm | 411/45 |
| 4,230,017 | 10/1980 | Angelosanto | 411/361 X |
| 4,405,256 | 9/1983 | King, Jr. | 411/360 X |
| 4,478,543 | 10/1984 | Lyon | 411/908 X |
| 4,478,544 | 10/1984 | Strand | 411/908 X |

Primary Examiner—Peter A. Nelson
Attorney, Agent, or Firm—Lyman R. Lyon

[57] ABSTRACT

A composite rivet comprising an axially compressible and radially expandable tubular plastic preform with a mandrel extending centrally thereof and a collar radially aligned with an annular recess in said mandrel for controlling radial deformation of the preform and locking of the mandrel in the rivet.

2 Claims, 2 Drawing Figures

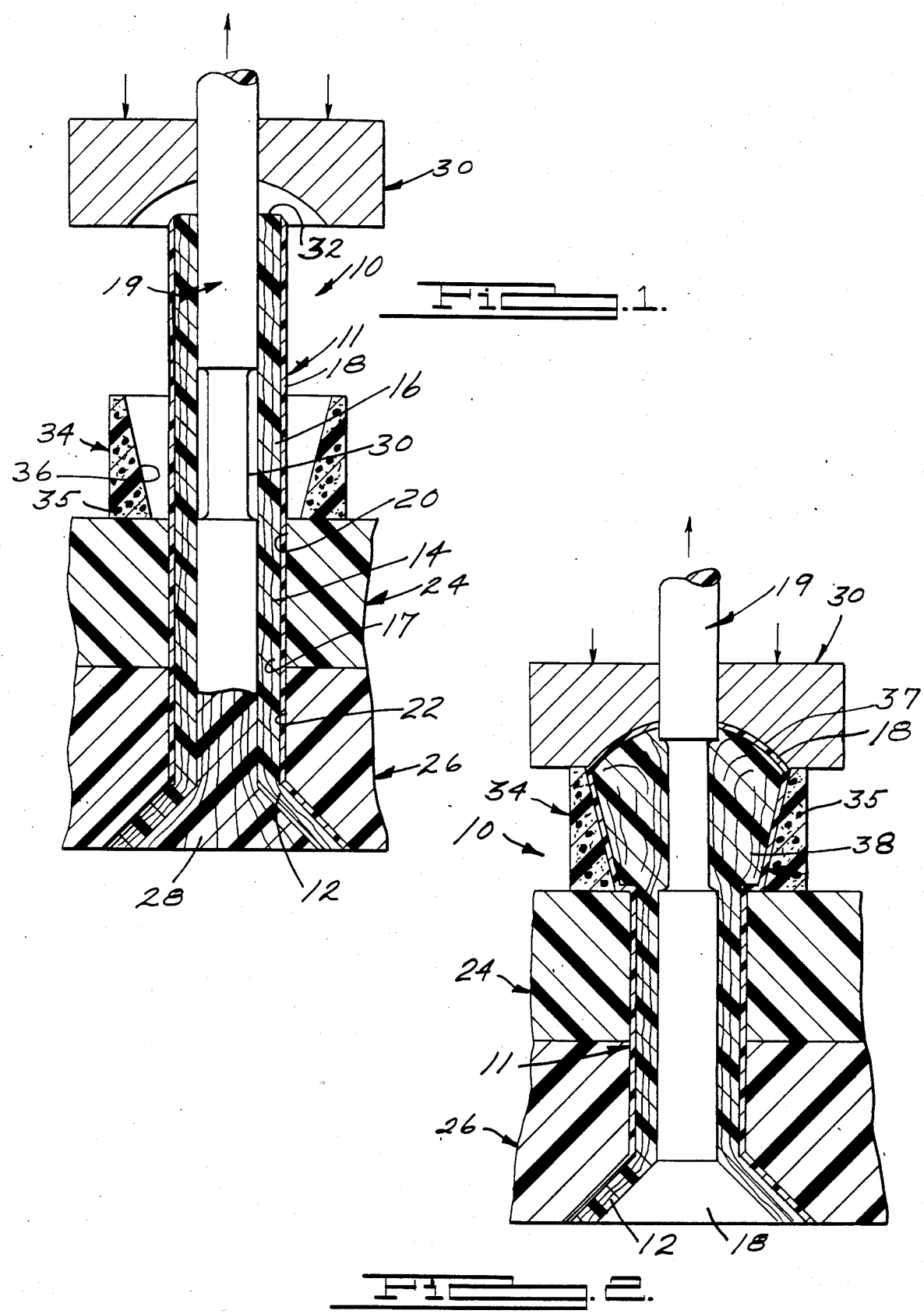

COMPOSITE RIVET WITH COLLAR REINFORCED WITH CIRCUMFERENTIAL FIBERS

BACKGROUND OF THE INVENTION

The rivet of the instant invention is an improvement on the composite rivet disclosed in U.S. Pat. No. 4,478,544 issued Oct. 23, 1984, for Composite Rivet, and assigned to the assignee hereof.

Carbon fiber reinforced materials are widely used in the aircraft industry of airframe structural components. However, one characteristic of composite materials utilizing carbon fibers is that the carbon fibers are difficult to reform. Thus, the use of carbon fiber reinforced resins in rivets has heretofore been limited by the difficulty of efficiently forming the rivet heads.

SUMMARY OF THE INVENTION

The aforesaid problem is solved by reforming an end portion of a preform about an internal mandrel that is tensioned relative to a workpiece. Compression of the fibers and resin matrix of the preform is accomplished by a suitable tool and is controlled by an annular collar. Reformation of the preform is enabled by the use of a thermoplastic or "B"-stage thermoset resin matrix, which is softened due to the application of heat. A radially extending rivet head is formed that is integral with the shear portion of the rivet and which, when fully formed results in a riveted connection that exhibits relatively high strength in shear and tension.

BRIEF DESCRIPTION OF THE DRAWINGS

FIG. 1 is a sectional view of a preferred embodiment of the rivet of the instant invention; and FIG. 2 is a view of the rivet of FIG. 1 after advancement of a forming tool concurrently with tensioning of the rivet mandrel to form a head on the installed rivet.

DETAILED DESCRIPTION OF THE PREFERRED EMBODIMENT OF THE INVENTION

As seen in FIG. 1 of the drawings, a rivet 10 in accordance with a constructed embodiment of the instant invention comprises a tubular thermoplastic or "B"-stage thermoset resin preform 11 having a preformed conical head portion 12, a shear portion 14, and a head forming portion 16. The preform 11 is reinforced by parallel carbon fibers 17 and by a woven or braided Kevlar sheath 18.

A mandrel 19 of, for example, unidirectional carbon fiber reinforced thermoset plastic is disposed centrally of the preform 11 to facilitate tensioning of the rivet 10 during the setting operation. The shear portion 14 of the preform 11 and the mandrel 19 of the rivet 10 extend through complementary apertures 20 and 22 in a pair of workpieces 24 and 26, respectively. The mandrel 19 has a head portion 28 complementary to the head portion 12 of the preform 11 and an annular groove 30 for locking the mandrel 19 of the rivet 10 in the workpieces 24 and 26.

As seen by comparing FIG. 1 with FIG. 2 of the drawings, the mandrel 19 of the rivet 10 is adapted to be pulled upwardly, after heating of the preform 11, by a tool (not shown) of conventional design while a tool 30 is concomitantly biased downwardly against a shoulder 32 on the head forming portion 16 of the preform 11 resulting in deformation of head forming portion into the headed configuration shown in FIG. 2.

In accordance with one feature of the instant invention, deformation of the head forming portion 16 of the preform 11 is controlled by a fully polymerized collar 34 having filament wound or braided circumferential fiber reinforcement fibers 35. The collar 34 also has an upwardly divergent truncated conical internal surface 36 that effects a mechanical lock of the collar 34 against the workpiece 24. Concomitantly, deformation of the head forming portion 16 of the preform 11 into the groove 30 of the mandrel 19 effects a mechanical lock thereof in the rivet assembly 10.

The thermoplastic or "B"-stage resin matrix of the preform 11 is softened by the application of heat by, for example, a hot air blast, preheat of the tool 30, preheat of the entire preform 11, or heating of the entire rivet 10 assembly in situ.

As seen in FIG. 2, a relatively smooth exterior surface is developed on an upper surface 37 of a reformed portion 38 of the preform 11 due to the provision of the external woven Kevlar sheath 18 on the preform 11. The length of the head forming portion 16 and the diameters of the mandrel 19 and collar 34 are sized so that the Kevlar sheath 18 covers the reformed head 38 thereby to present a smooth upper surface 37. The reformed head 38 also maintains clamp-up of the rivet 10 on the workpieces 24 and 26 in conjunction with the head 12 of the rivet 10.

While the preferred embodiment of the invention has been disclosed, it should be appreciated that the invention is susceptible of modification without departing from the scope of the following claims.

I claim:

1. A composite rivet comprising
   a tubular plastic preform having a first head portion, a shear portion and a head forming portion,
   a mandrel extending centrally of said preform and having an annular recess therein,
   the head forming portion of said preform being axially deformable and radially inwardly and outwardly expandable to form a second head on said rivet, and
   a plastic collar reinforced with circumferentially extending fibers, said collar having an inside diameter greater than the outside diameter of said mandrel and telescoped about said preform and radially aligned with the annular recess in said mandrel for controlling radial deformation of the head forming portion of said preform, said collar having a truncated upwardly divergent conical inner surface.

2. A composite rivet comprising
   a tubular plastic preform having a first head portion, a shear portion and a head forming portion,
   a mandrel extending centrally of said preform and having an annular recess therein,
   the head forming portion of said preform being axially deformable radially inwardly into the annular recess in said mandrel and radially outwardly to form an integral second head on said rivet, and
   a collar telescoped about said preform and radially aligned with the annular recess in said mandrel for controlling radial deformation of the head forming portion of said preform,
   said collar having a truncated upwardly divergent conical inner surface radially spaced from the mandrel of said rivet whereby said collar is wedged against a workpiece by the radially outwardly deformable portion of said preform.

* * * * *